(12) United States Patent
Kitayama et al.

(10) Patent No.: US 10,131,025 B2
(45) Date of Patent: Nov. 20, 2018

(54) WORKPIECE POSITIONING DEVICE FOR POSITIONING WORKPIECE

(71) Applicant: FANUC CORPORATION, Minamitsuru-gun, Yamanashi (JP)

(72) Inventors: Ayumu Kitayama, Yamanashi (JP); Mototsugu Takenami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 280 days.

(21) Appl. No.: 15/214,990

(22) Filed: Jul. 20, 2016

(65) Prior Publication Data

US 2017/0021470 A1    Jan. 26, 2017

(30) Foreign Application Priority Data

Jul. 24, 2015    (JP) ................................. 2015-146831

(51) Int. Cl.
| | |
|---|---|
| *B23Q 15/22* | (2006.01) |
| *B23K 26/03* | (2006.01) |
| *B23K 26/08* | (2014.01) |
| *B23K 26/04* | (2014.01) |
| *G05B 19/401* | (2006.01) |

(52) U.S. Cl.
CPC ............ *B23Q 15/22* (2013.01); *B23K 26/032* (2013.01); *B23K 26/04* (2013.01); *B23K 26/0853* (2013.01); *G05B 19/4015* (2013.01); *G06T 2207/30164* (2013.01)

(58) Field of Classification Search
CPC ...... B23K 26/03; B23K 26/032; B23K 26/04; B23K 26/0853; G01B 11/03; G01B 21/042; G05B 19/4015; G06T 2207/10012; G06T 2207/30164; B23Q 15/22
See application file for complete search history.

(56) References Cited

U.S. PATENT DOCUMENTS

| | | | |
|---|---|---|---|
| 5,890,872 A | 4/1999 | Todoki et al. | |
| 8,872,913 B2 * | 10/2014 | Wang .................. | G05B 19/4015 348/95 |
| 9,678,493 B2 * | 6/2017 | Ishikawa .................. | G03B 5/00 |
| 2009/0141131 A1 * | 6/2009 | Arai ........................ | G01B 11/03 348/187 |

(Continued)

FOREIGN PATENT DOCUMENTS

| | | |
|---|---|---|
| CN | 1157939 A | 8/1997 |
| CN | 1113272 C | 7/2003 |

(Continued)

*Primary Examiner* — Crystal J Barnes-Bullock
(74) *Attorney, Agent, or Firm* — RatnerPrestia (57) ABSTRACT

A workpiece positioning device has a more simple structure and a low cost. The workpiece positioning device includes a movable base on which a workpiece is placed, drive mechanisms for moving the movable base, a vision sensor for repeatedly detecting the current position of the workpiece placed on the movable base, a difference calculating part for calculating the difference between the current position and the target position each time the current position is detected by the vision sensor, a difference determining part for determining whether the difference is within an allowable range, and a drive controller for controlling the drive mechanisms so as to stop the movement of the movable base when it is determined that the difference is within the allowable range.

4 Claims, 6 Drawing Sheets

(56) References Cited

U.S. PATENT DOCUMENTS

2015/0134099 A1    5/2015    Hishikawa et al.

FOREIGN PATENT DOCUMENTS

| | | |
|---|---|---|
| CN | 101112746 A | 1/2008 |
| CN | 100560287 C | 11/2009 |
| EP | 1840686 A1 | 10/2007 |
| JP | H05055787 | 3/1993 |
| JP | H05337863 | 12/1993 |
| JP | H06012112 | 1/1994 |
| JP | H06250713 | 9/1994 |
| JP | 3782820 B1 | 6/2006 |
| JP | 2007112051 | 5/2007 |
| JP | 2008080362 A * | 4/2008 |
| JP | 2009076633 A | 4/2009 |
| JP | 2011-110628 A | 6/2011 |
| JP | 5468366 B2 | 4/2014 |
| JP | 5952875 B2 * | 7/2016 |
| WO | 2006077629 A1 | 7/2006 |

* cited by examiner

WORKPIECE POSITIONING DEVICE FOR POSITIONING WORKPIECE

BACKGROUND OF THE INVENTION

1. Field of the Invention

The invention relates to a workpiece positioning device for positioning a workpiece at a predetermined target position.

2. Description of Related Art

A device for positioning a workpiece at a target position by calculating the difference between the position of a workpiece detected by a vision sensor and a predetermined target position of the workpiece, to obtain the amount of movement necessary for the workpiece based on the difference, has been known (see, for example, Japanese Unexamined Patent Publication (Kokai) No. 2011-110628).

According to conventional technologies, a movement mechanism for precisely moving a workpiece, or a jig or a clamp mechanism for preventing a position gap of a workpiece from occurring during the movement of the workpiece, has been required. This causes a more complicated facility and increases a production cost.

SUMMARY OF THE INVENTION

In an aspect of the invention, a workpiece positioning device, which positions a workpiece at a predetermined target position, includes a movable base on which a workpiece is placed, a drive mechanism which moves the movable base, and a vision sensor which repeatedly images the workpiece placed on the movable base, and repeatedly detects a current position of the workpiece.

The workpiece positioning device includes a difference calculating part which calculates a difference between the detected current position and the target position each time the current position is detected by the vision sensor, a difference determining part which determines whether the calculated difference is within an allowable range each time the difference is calculated by the difference calculating part, and a drive controller which controls the drive mechanism so as to stop the movement of the movable base when the difference determining part determines that the difference is within the allowable range.

The drive mechanisms may be able to move the movable base in a predetermined plurality of directions. The workpiece positioning device may further include a direction determining part which determines a movement direction of the movable base, which can reduce the difference, from the plurality of directions, when the difference determining part determines that the difference is out of the allowable range.

The drive controller may control the drive mechanisms so as to move the movable base in the movement direction determined by the direction determining part, when the difference determining part determines that the difference is out of the allowable range.

If the movement direction determined by the direction determining part is opposite to a direction in which the movable base moves at the time when the movement direction is determined, the drive controller may move the movable base in the determined movement direction at a speed lower than the moving speed of the movable base at the time when the movement direction is determined.

The vision sensor may further detect the current position of the workpiece after the drive controller stops the movement of the movable base. The difference calculating part may calculate the difference between the target position and the current position detected by the vision sensor after the movement of the movable base is stopped. The difference determining part may determine whether the difference calculated by the difference calculating part after the movement of the movable base is stopped is within the allowable range.

The direction determining part may again determine the movement direction of the movable base, which can reduce the difference, from the plurality of directions, when the difference determining part determines that the difference is out of the allowable range after the movement of the movable base is stopped. The drive controller may control the drive mechanism so as to move the movable base in the movement direction determined by the direction determining part after the movement of the movable base is stopped.

The workpiece positioning device may include a first drive mechanism which moves the movable base along a first axis, and a second drive mechanism which moves the movable base along a second axis intersecting with the first axis.

The difference calculating part may calculate a first difference between the current position and the target position in the first axis direction, and a second difference between the current position and the target position in the second axis direction. The difference determining part may determine whether the first difference is within a first allowable range, and whether the second difference is within a second allowable range.

The drive controller may control the first drive mechanism so as to stop the movement of the movable base in the first axis direction when the difference determining part determines that the first difference is within the first allowable range.

The drive controller may control the second drive mechanism so as to stop the movement of the movable base in the second axis direction when the difference determining part determines that the second difference is within the second allowable range.

BRIEF DESCRIPTION OF THE DRAWINGS

These and other objects, features and advantages of the invention will be clarified in view of the detailed description of exemplary embodiments with reference to the accompanying drawings, in which.

DETAILED DESCRIPTION

Embodiments of the invention will be described below in detail based on the accompanying drawings. First, with reference to FIGS. 1 and 2, a workpiece positioning device 10 according to an embodiment of the invention will be described. Note that, in the following description, the x-axis, y-axis and z-axis directions indicated by the orthogonal coordinate system shown in the drawings are used as reference directions, for convenience.

Figure 1:
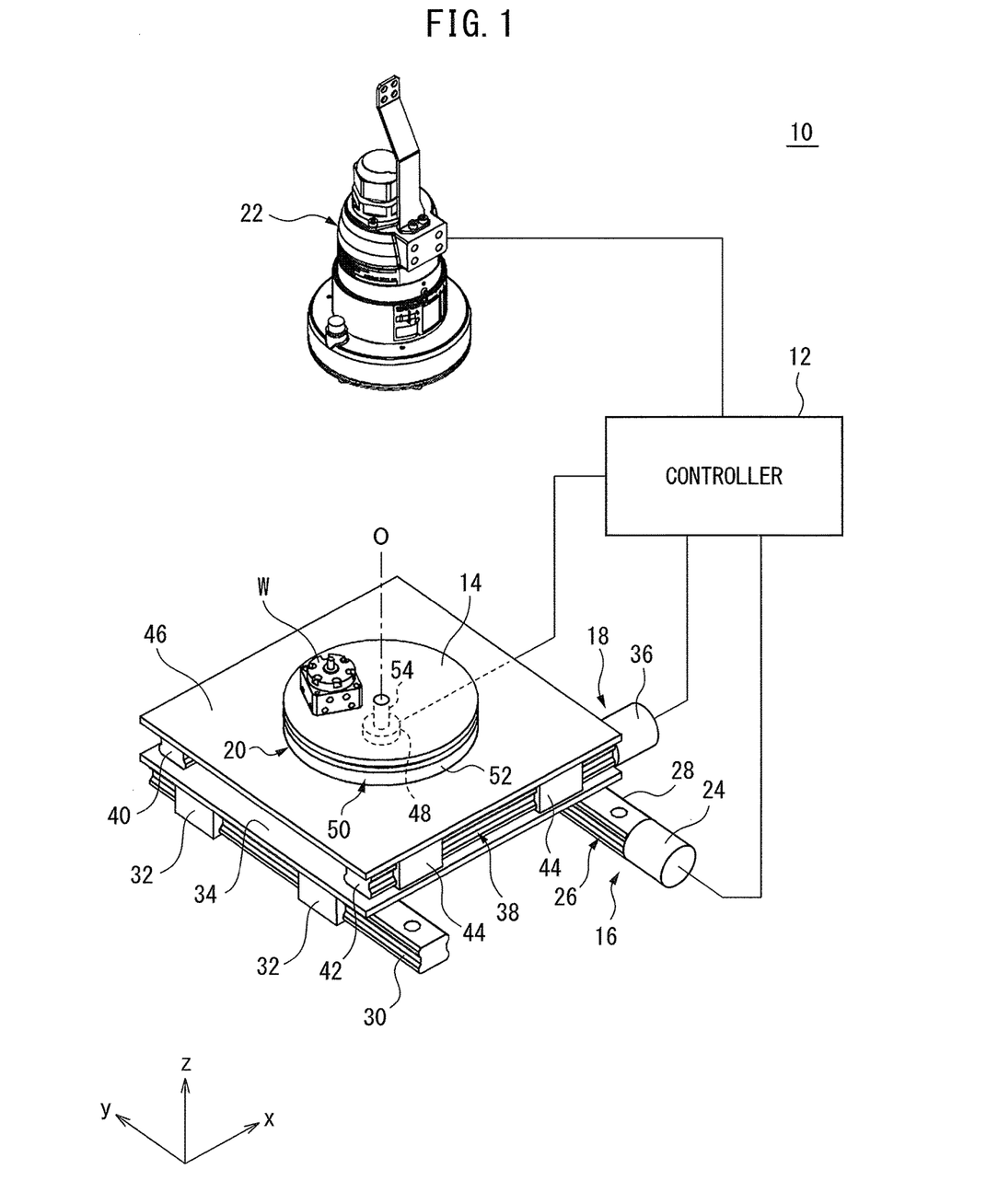
FIG. 1 is a view of a workpiece positioning device according to an embodiment of the invention.
Figure 2:
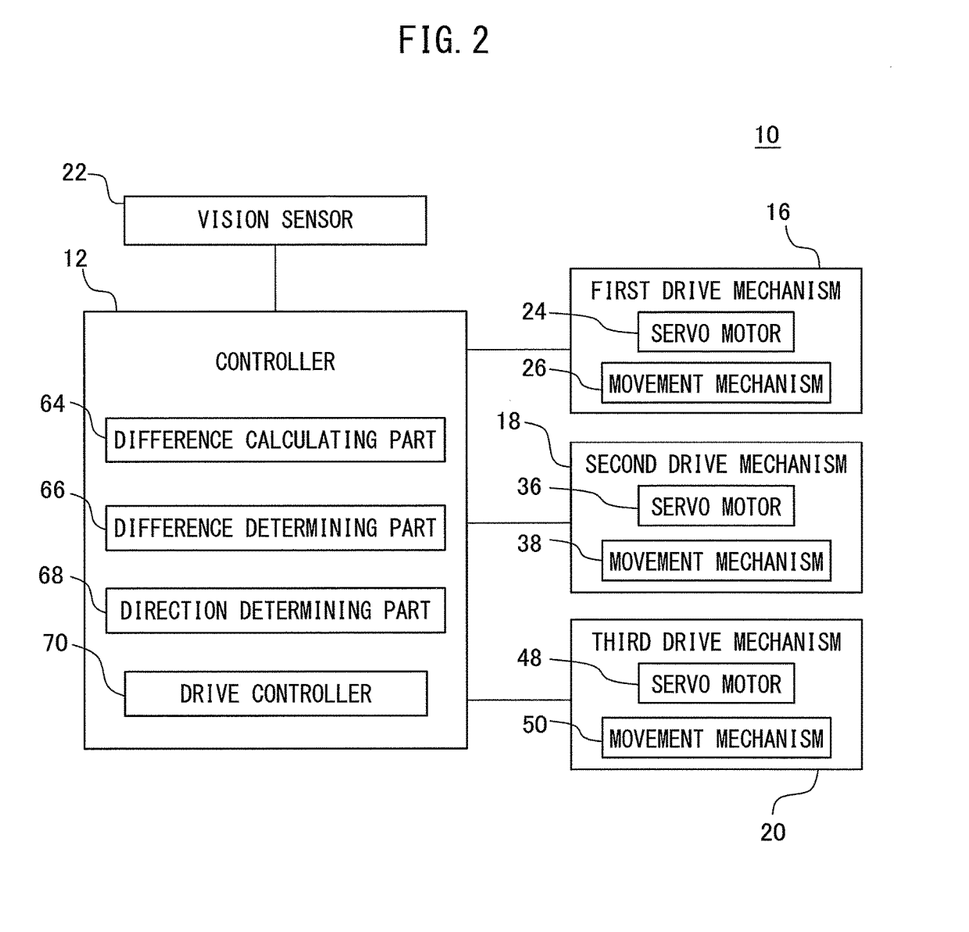
FIG. 2 is a block diagram of the workpiece positioning device shown in FIG. 1.

The workpiece positioning device 10 includes a controller 12, a movable base 14, a first drive mechanism 16, a second drive mechanism 18, a third drive mechanism 20, and a vision sensor 22. The controller 12 includes e.g. a CPU and a storage, and directly or indirectly controls each component of the workpiece positioning device 10.

The first drive mechanism 16 includes a servo motor 24 and a movement mechanism 26. The servo motor 24 includes an output shaft (not shown), and rotates the output shaft in accordance with a command from the controller 12.

The movement mechanism 26 includes a pair of rails 28 and 30, movable members 32 slidably arranged on the rails 28 and 30, a pedestal 34 fixed on the movable members 32, a reducer (not shown) and a motion conversion mechanism (not shown).

The rails 28 and 30 are disposed so as to be spaced away from each other in the x-axis direction, and extend in the y-axis direction. The movable members 32 are guided by the rails 28 and 30, and are movable in the y-axis direction along the rails 28 and 30.

The output shaft of the servo motor 24 is mechanically connected to the movable members 32 via the reducer and the motion conversion mechanism. The motion conversion mechanism is comprised of e.g. a ball screw mechanism, and converts the rotational movement of the output shaft of the servo motor 24 to a reciprocal movement in the y-axis direction. Thus, as the servo motor 24 is driven to rotate, the pedestal 34 is reciprocated in the y-axis direction.

The second drive mechanism 18 includes a servo motor 36 and a movement mechanism 38. The servo motor 36 includes an output shaft (not shown), and rotates the output shaft in accordance with a command from the controller 12.

The movement mechanism 38 includes a pair of rails 40 and 42, movable members 44 slidably arranged on the rails 40 and 42, a pedestal 46 fixed on the movable members 44, a reducer (not shown) and a motion conversion mechanism (not shown).

The rails 40 and 42 are fixed on the pedestal 34 of the first drive mechanism 16, and moves integrally with the pedestal 34. The rails 40 and 42 are disposed so as to be spaced away from each other in the y-axis direction, and extend in the x-axis direction.

The movable members 44 are guided by the rails 40 and 42, and are movable in the x-axis direction along the rails 40 and 42. The output shaft of the servo motor 36 is mechanically connected to the movable members 44 via the reducer and the motion conversion mechanism.

This motion conversion mechanism is comprised of e.g. a ball screw mechanism, and converts the rotational movement of the output shaft of the servo motor 36 to a reciprocal movement in the x-axis direction. Thus, as the servo motor 36 is driven to rotate, the pedestal 46 is reciprocated in the x-axis direction with respect to the rails 40 and 42.

The third drive mechanism 20 includes a servo motor 48 and a movement mechanism 50. The servo motor 48 includes an output shaft (not shown), and rotates the output shaft in accordance with a command from the controller 12.

The movement mechanism 50 includes a turntable 52, a shaft 54, and a reducer (not shown). The turntable 52 is disposed on the pedestal 46 of the second drive mechanism 18 so as to rotate about an axis O. In this embodiment, the axis O is parallel to the z-axis.

The output shaft of the servo motor 48 is mechanically connected to the turntable 52 via the reducer and the shaft 54. The turntable 52 is driven to rotate about the axis O by the servo motor 48.

The movable base 14 is fixed on the turntable 52. A workpiece W is placed on the movable base 14 by e.g. a robot. The movable base 14 is moved in the y-axis direction by the first drive mechanism 16, moved in the x-axis direction by the second drive mechanism 18, and rotated about the axis O by the third drive mechanism 20, by the commands from the controller 12.

The vision sensor 22 images the workpiece W placed on the movable base 14 and detects the position of the workpiece W, in accordance with a command from the controller 12. Specifically, the vision sensor 22 is arranged at a position separated away from the movable base 14 in the z-axis positive direction, and includes an imaging part able to image the whole of the movable base 14.

The vision sensor 22 acquires data indicative of the current position of the workpiece W, such as an x-coordinate and a y-coordinate in an x-y plane, from image data of the workpiece W imaged by the imaging part. The vision sensor 22 transmits the data indicative of the current position of the detected workpiece W to the controller 12. Note that, the details of the data indicative of the current position of the workpiece W will be described later.

Figure 3:
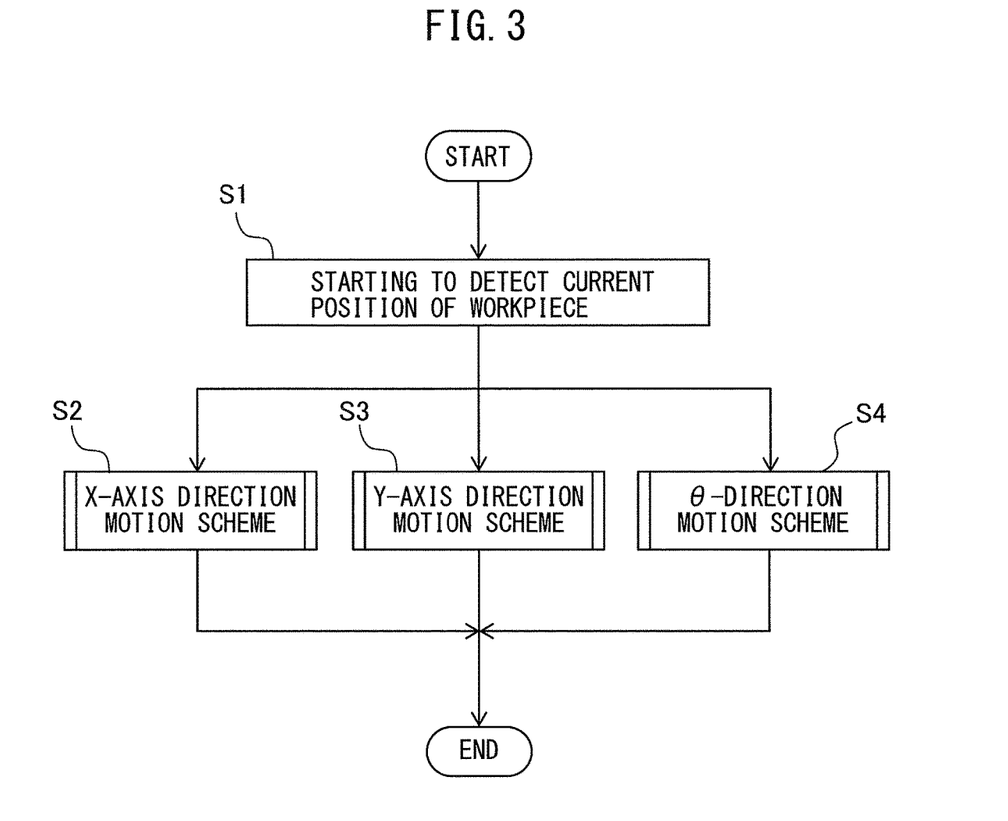
FIG. 3 is a flowchart showing an example of an operation flow of the workpiece positioning device shown in FIG. 1.

Next, with reference to FIGS. 1 to 4, the movement of the workpiece positioning device 10 will be described. The flowchart shown in FIG. 3 is started when the controller 12 receives a workpiece positioning command from a user, host controller, or robot program. For example, the workpiece positioning command is transmitted to the controller 12 when the workpiece W is placed on the movable base 14 by e.g. a robot.

At step S1, the controller 12 transmits a command to the vision sensor 22 so as to start to detect the current position of the workpiece W placed on the movable base 14. The vision sensor 22 repeatedly images the workpiece W at a predetermined period T (e.g., one second) after receiving the command from the controller 12.

Figure 5:
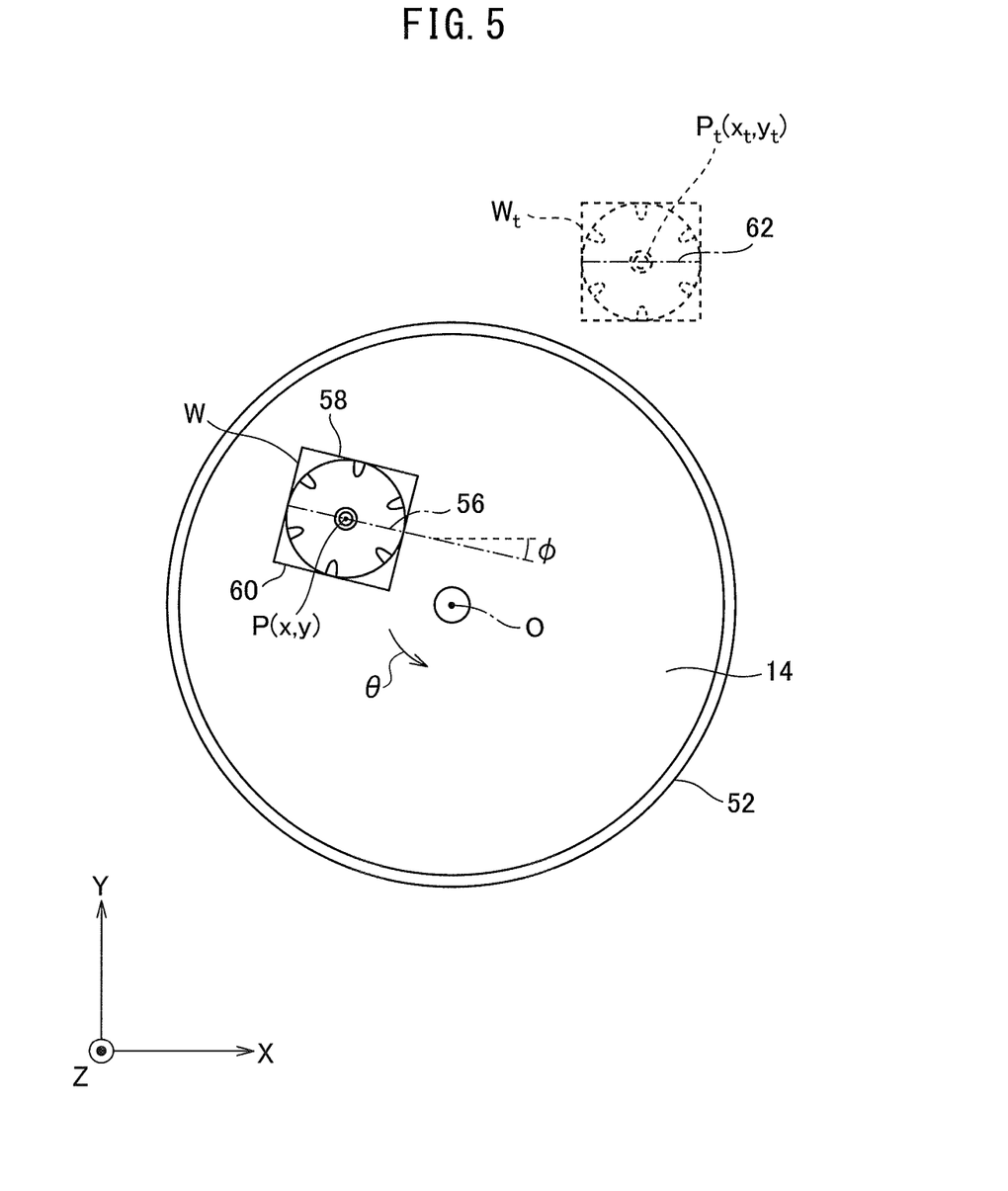
FIG. 5 is a view showing the positional relationship between a workpiece placed on the movable base by e.g. a robot and a target position of the workpiece.

FIG. 5 shows an example of image data imaged by the vision sensor 22. The current position of the workpiece W at the time when the image shown in FIG. 5 is imaged is a position spaced away from the center axis O of the turntable 52 in the x-axis negative direction and the y-axis positive direction.

As an example, the vision sensor 22 analyses the image data shown in FIG. 5, and calculates a central coordinate $P(x, y)$ of the workpiece W and an inclination angle $\phi$ of a reference line 56 with respect to the x-axis, as the data indicative of the current position of the workpiece W. The reference line 56 is set to the workpiece W.

The reference line 56 is a phantom line indicating an inclination of the workpiece W in the x-y plane, and is pre-set by a user. In this embodiment, the reference line 56 is set as a straight line which is parallel to outer surfaces 58, 60 of the workpiece W and which passes through the central coordinate P of the workpiece W.

On the other hand, a dotted line $W_t$ in FIG. 5 represents a target position $W_t$ at which the workpiece W should be positioned. The target position $W_t$ of the workpiece W is predetermined by a user, and stored in the storage of the controller 12.

More specifically, the storage pre-stores a central coordinate $P_t(x_t, y_t)$ of the target position $W_t$ and an inclination angle $\phi_t$, of a reference line 62 of the target position $W_t$ with respect to the x-axis, as data indicative of the target position W. The reference line 62 corresponds to the above-mentioned reference line 56. In the example shown in FIG. 5, the reference line 62 of the target position $W_t$ is parallel to the x-axis, and therefore the inclination angle $\phi_t$ is zero.

At this step S1, the vision sensor 22 analyzes the image repeatedly imaged at the period T so as to successively calculate the central coordinate P(x, y) and the inclination angle $\phi$ of the reference line 56 with respect to the x-axis, and successively transmits it to the controller 12 as the data indicative of the current position of the workpiece W at the time of imaging it.

After step S1, the controller 12 concurrently carries out an x-axis direction motion scheme at step S2, a y-axis direction motion scheme at step S3, and a θ-direction motion scheme at step S4. The operation flow at step S2 will be described below with reference to FIG. 4.

After step S2 is started, at step S11, the controller 12 calculates a difference between the target position $W_t$ and the current position of the workpiece W in the x-axis direction. Specifically, the controller 12 calculates a difference $\delta x_n$ between $x_n$ and $x_t$ (i.e., $\delta x_n = x_t - x_n$), in which $x_n$ is the x-coordinate of the central coordinate $P_n(x_n, y_n)$ of the workpiece W received from the vision sensor 22 for the n-th time ("n" is a positive integer) at step S1, while $x_t$ is the x-coordinate of the central coordinate $P_t(x_t, y_t)$ of the target position W.

Thus, in this embodiment, the controller 12 functions as a difference calculating part 64 (FIG. 2) which calculates the difference between the current position and the target position $W_t$ each time the current position of the workpiece W is detected by the vision sensor 22.

At step S12, the controller 12 determines whether the difference $\delta x_n$ calculated at step S11 is within a predetermined allowable range. Specifically, the storage stores a first allowable range [$\beta_1$, $\beta_2$] which is predetermined for the difference $\delta x_n$.

The controller 12 compares the difference $\delta x_n$ with the first allowable range [$\beta_1$, $\beta_2$] and determines whether $\beta_1 \leq \delta x_n \leq \beta_2$ is satisfied. When the controller 12 determines that $\beta_1 \leq \delta x_n \leq \beta_2$ is satisfied (i.e., determines "YES"), it proceeds to step S13.

On the other hand, when the controller 12 determines that $\delta x_n < \beta_1$ or $\beta_2 < \delta x_n$ is satisfied (i.e., determines "NO"), it proceeds to step S14. Thus, in this embodiment, the controller 12 functions as a difference determining part 66 (FIG. 2) which determines whether the difference $\delta x_n$ is within a predetermined allowable range each time the difference $\delta x_n$ is calculated.

When having determined "NO" at step S12, at step S14, the controller 12 determines a movement direction of the movable base 14 which can reduce the difference $\delta x_n$ (in other words, the difference $\delta x_n$ can be reduced if the movable base 14 is moved in the movement direction). For example, in the example shown in FIG. 5, since the target position $W_t$ is positioned separate away from the current position of the workpiece W in the x-axis positive direction, the difference $\delta x_n (= x_t - x_n)$ calculated at step S11 is a positive value.

In this case, the controller 12 determines the movement direction of the movable base 14 driven by the second drive mechanism 18 as the "x-axis positive direction". On the other hand, when the difference $\delta x_n$ is a negative value, the controller 12 determines the movement direction of the movable base 14 driven by the second drive mechanism 18 as the "x-axis negative direction".

Thus, in this embodiment, the controller 12 functions as a direction determining part 68 (FIG. 2) which determines the movement direction of the movable base 14, which can reduce the difference $\delta x_n$, from the "x-axis positive direction" and the "x-axis negative direction".

At step S15, the controller 12 determines whether the movement direction determined at step S14 is reversed from the direction in which the movable base 14 actually moves when step S14 is started.

As described later, the controller 12 moves the movable base 14 along the x-axis by the second drive mechanism 18, in order to cause the workpiece W to approach the target position $W_t$. Here, assume that the movable base 14 is moved in the x-axis positive direction by the second drive mechanism 18 when step S14 is started, and the movement direction of the movable base 14 is determined to be the "x-axis negative direction" at step S14.

In this case, at this step S15, the controller 12 determines that the movement direction determined at step S14 is reversed from the direction in which the movable base 14 actually moves when step S14 is started (i.e., determines "YES"), and proceeds to step S16.

On the other hand, when the controller 12 determines that the movement direction determined at step S14 is the same as the direction in which the movable base 14 actually moves when step S14 is started (i.e., determines "NO"), it proceeds to step S17.

At step S16, the controller 12 sets the moving speed of the movable base 14 to a second moving speed $V_{x2}$ lower than a first moving speed $V_{x1}$ applied at the start of step S14.

Here, at the start of the flow shown in FIG. 3, the rotation speed command, which is transmitted from the controller 12 to the servo motor 36 of the second drive mechanism 18 in order to move the movable base 14 by the second drive mechanism 18, is set to a first rotation speed command corresponding to the first moving speed $V_{x1}$.

Therefore, if the controller 12 normally moves the movable base 14 by the second drive mechanism 18, it transmits the first rotation speed command to the servo motor 36 of the second drive mechanism 18, thereby the movable base 14 is moved in the x-axis direction at the first moving speed $V_{x1}$.

On the other hand, when having determined "YES" at step S15, at step S16, the controller 12 changes the setting of the rotation speed command, which is to be transmitted to the servo motor 36 of the second drive mechanism 18, from the first rotation speed command to a second rotation speed command corresponding to the second moving speed $V_{x2}$.

Then, at step S17 which will be described later, the controller 12 transmits the second rotation speed command to the servo motor 36 of the second drive mechanism 18 so as to move the movable base 14 in the x-axis direction at the second speed $V_{x2}$ lower than the first speed $V_{x1}$.

Thus, in this embodiment, the controller 12 changes the setting of the moving speed so as to reduce the moving speed of the movable base 14, if the controller 12 determines "YES" at step S15.

At step S17, the controller 12 controls the second drive mechanism 18 to move the movable base 14 in the direction determined at step S14 or step S20 described later.

Specifically, the controller 12 transmits the first or second rotation speed command set at the current time, to the servo motor 36 of the second drive mechanism 18, so as to move the movable base 14 in the x-axis direction by the second drive mechanism 18. Thus, in this embodiment, the controller 12 functions as a drive controller 70 which controls the second drive mechanism 18.

After step S17 is carried out, the controller 12 returns to step S11. Then, the controller 12 again calculates a difference $\delta x_{n+1}$ between $x_{n+1}$ and $x_t$ (i.e., $\delta x_{n+1} = x_t - x_{n+1}$), in which $x_{n+1}$ is the x-coordinate of a central coordinate $P_{n+1}$ $(x_{n+1}, y_{n+1})$ of the workpiece W received from the vision sensor 22 for the (n+1)-th time at step S1, while $x_t$ is the x-coordinate of the central coordinate $P_t$ of the target position. Then, the controller 12 again determines whether the difference is within the first allowable range $[\beta_1, \beta_2]$ at step S12.

In this way, the controller 12 executes steps S11, S12, and S14 to S17 each time the current position of the workpiece W is detected by the vision sensor 22 at step S1, until the controller 12 determines "YES" at step S12.

When the controller 12 determines "YES" at step S12, at step S13, the controller 12 functions as the drive controller 70 and controls the second drive mechanism 18 so as to stop the movement of the movable base 14.

Specifically, the controller 12 transmits a command to the servo motor 36 of the second drive mechanism 18 so as to stop the rotation of the servo motor 36, thereby the movement of the movable base 14 in the x-axis direction is stopped.

At step S18, the controller 12 calculates the difference between the x-coordinate of the central coordinate $P_t$ of the target position and the x-coordinate of the central coordinate P of the current position received from the vision sensor 22, similar to the above-mentioned step 11.

Specifically, the controller 12 acquires from the vision sensor 22 a central coordinate $P_m(x_m, y_m)$ of the workpiece W which is further detected by the vision sensor 22 after step S13. Then, the controller 12 calculates a difference $\delta x_m$ between $x_m$ and $x_t$ (i.e., $\delta x_m = x_t - x_m$), in which $x_m$ is the x-coordinate of the central coordinate $P_m(x_m, y_m)$, while $x_t$ is the x-coordinate of the central coordinate $P_t$ of the target position.

At step S19, the controller 12 determines whether the difference $\delta x_m$ calculated at step S18 satisfies $\beta_1 \leq \delta x_m \leq \beta_2$. When the controller 12 determines that $\beta_1 \leq \delta x_m \leq \beta_2$ is satisfied (i.e., determines "YES"), the controller 12 ends step S2 shown in FIG. 4. On the other hand, when the controller 12 determines that $\delta x_m < \beta_1$ or $\beta_2 < \delta x_m$ is satisfied (i.e., determines "NO"), it proceeds to step S20.

At step S20, the controller 12 determines the movement direction of the movable base 14 which can reduce the difference $\delta x_m$ calculated at step S18, similar to the above-mentioned step S14, and proceeds to step S16. Then, the controller 12 executes a loop of steps S11 to S20 until it determines "YES" at steps S12 and S19.

The controller 12 executes step S3 concurrently with step S2. In this embodiment, step S3 is an operation flow similar to that of step S2. The operation flow of step S3 will be described below with reference to FIG. 4.

After step S3 is started, at step S31, the controller 12 functions as the difference calculating part 64 and calculates the difference in the y-axis direction between the target position $W_t$ and the current position of the workpiece W.

Specifically, the controller 12 calculates a difference $\delta y_n$ between $y_n$ and $y_t$ (i.e., $\delta y_n = y_t - y_n$), in which $y_n$ is the y-coordinate of the central coordinate $P_n(x_n, y_n)$ of the workpiece W received from the vision sensor 22 for the n-th time at step S1, while $y_t$ is the y-coordinate of the central coordinate $P_t(x_t, y_t)$ of the target position.

At step S32, the controller 12 functions as the difference determining part 66 and determines whether the difference $\delta y_n$ calculated at step S31 is within a predetermined allowable range. Specifically, the controller 12 compares the difference $\delta y_n$ with a pre-stored second allowable range $[\gamma_1, \gamma_2]$, and determines whether $\gamma_1 \leq \delta y_n \leq \gamma_2$ is satisfied.

The controller 12 proceeds to step S33 when it determines that $\gamma_1 \leq \delta y_n \leq \delta_2$ is satisfied (i.e., determines "YES"). On the other hand, the controller 12 proceeds to step S34 when it determines that $\delta y_n < \gamma_1$ or $\gamma_2 < \delta y_n$ is satisfied (i.e., determines "NO").

When the controller 12 determines "NO" at step S32, at step S34, the controller 12 functions as the direction determining part 68 and determines the movement direction of the movable base 14 which can reduce the difference $\delta y_n$.

For example, in the example shown in FIG. 5, since the target position $W_t$ is positioned separate away from the current position of the workpiece W in the y-axis positive direction, the difference $\delta y_n (=y_t - y_n)$ calculated at step S31 is a positive value.

In this case, the controller 12 determines the movement direction of the movable base 14 driven by the first drive mechanism 16 as the "y-axis positive direction". On the other hand, if the difference $\delta y_n$ is a negative value, the controller 12 determines the movement direction of the movable base 14 driven by the first drive mechanism 16 as the "y-axis negative direction".

At step S35, the controller 12 determines whether the movement direction determined at step S34 is reversed from the direction in which the movable base 14 actually moves when step S34 is started.

Assume that the movable base 14 is moved by the first drive mechanism 16 in the y-axis positive direction when step S34 is started, and the movement direction of the movable base 14 is determined to be the "y-axis negative direction" in the step S34.

In this case, at this step S35, the controller 12 determines that the movement direction determined at step S34 is reversed from the direction in which the movable base 14 actually moves when step S34 is started (i.e., determines "YES"), and proceeds to step S36.

On the other hand, when the controller 12 determines that the movement direction determined at step S34 is the same as the direction in which the movable base 14 actually moves when step S34 is started (i.e., determines "NO"), it proceeds to step S37.

At step S36, the controller 12 sets the moving speed of the movable base 14 at a second moving speed $V_{y2}$ lower than a first moving speed $V_{y1}$ applied at the start of step S34.

Here, at the start of the flow shown in FIG. 3, the rotation speed command transmitted from the controller 12 to the servo motor 24 of the first drive mechanism 16 is set to be a first rotation speed command corresponding to the first moving speed $V_{y1}$.

Therefore, when the controller 12 normally move the movable base 14 by the first drive mechanism 16, the controller 12 transmits the first rotation speed command to the servo motor 24 of the first drive mechanism 16, so as to move the movable base 14 in the y-axis direction at the first moving speed $V_{y1}$.

On the other hand, when having determined "YES" at step S35, at this step S36, the controller 12 changes the setting of the rotation speed command, which is to be transmitted to the servo motor 24 of the first drive mechanism 16, from the first rotation speed command to a second rotation speed command corresponding to the second moving speed $V_{y2}$.

Then, at step S37 which will be described later, the controller 12 transmits the second rotation speed command to the servo motor 24 of the first drive mechanism 16 so as to move the movable base 14 in the y-axis direction at the second moving speed $V_{y2}$ lower than the first moving speed $V_{y1}$.

At step S37, the controller 12 functions as the drive controller 70 and controls the first drive mechanism 16 so as to move the movable base 14 in the movement direction determined at step S34 or step S40 described later.

Specifically, the controller 12 transmits the first or second rotation speed command set at the current time to the servo motor 24 of the first drive mechanism 16, so as to move the movable base 14 in the y-axis direction by the first drive mechanism 16.

After step S37 is carried out, the controller 12 returns to step S31. Then, the controller 12 again calculates a difference $\delta y_{n+1}$ between $y_{n+1}$ and $y_t$ (i.e., $\delta y_{n+1}=y_t-y_{n+1}$), in which $y_{n+1}$ is the y-coordinate of a central coordinate $P_{n+1}$ ($x_{n+1}$, $y_{n+1}$) of the workpiece W received from the vision sensor 22 for the (n+1)-th time at step S1, while $y_t$ is the y-coordinate of the central coordinate $P_t$ of the target position. Then, at step S32, the controller 12 again determines whether the difference $\delta y_{n+1}$ is within the first allowable range.

Thus, the controller 12 executes steps S31, S32, and S34 to S37 each time the current position of the workpiece W is detected by the vision sensor 22 at step S1, until the controller 12 determined "YES" at step S32.

When the controller 12 determines "YES" at step S32, at step S33, the controller 12 functions as the drive controller 70 and controls the first drive mechanism 16 so as to stop the movement of the movable base 14.

Specifically, the controller 12 transmits a command to the servo motor 24 of the first drive mechanism 16 so as to stop the rotation of the servo motor 24, thereby the movement of the movable base 14 in the y-axis direction is stopped.

At step S38, the controller 12 calculates the difference between the y-coordinate of the central coordinate $P_t$ of the target position and the y-coordinate of the central coordinate P of the current position received from the vision sensor 22, similar to the above-mentioned step S31.

Specifically, the controller 12 acquires from the vision sensor 22 the central coordinate $P_m(x_m, y_m)$ of the workpiece W which is further detected by the vision sensor 22 after step S33 is ended. Then, the controller 12 calculates a difference $\delta y_m$ between $y_m$ and $y_t$ (i.e., $\delta y_m=x_t-x_m$), in which $y_m$ is the y-coordinate of the central coordinate $P_m(x_m, y_m)$, while $y_t$ is the y-coordinate of the central coordinate $P_t$ of the target position.

At step S39, the controller 12 determines whether the difference $\delta y_m$ calculated at step S38 satisfies $\gamma_1 \leq \delta y_m \leq \gamma_2$. The controller 12 ends step S3 shown in FIG. 4 when it determines that $\gamma_1 \leq \delta y_m \leq \gamma_2$ is satisfied (i.e., determined "YES"). On the other hand, the controller 12 proceeds to step S40 when it determines that $\delta y_m < \gamma_1$ or $\gamma_2 < \delta y_m$ is satisfied (i.e., determines "NO").

At step S40, the controller 12 determines the movement direction of the movable base 14 which can reduce the difference $\delta y_m$ calculated at step S38, similar to the above-mentioned step S34, and proceeds to step S36. Then, the controller 12 executes a loop of steps S31 to S40 until it determines "YES" at steps S32 and S39.

The controller 12 carries out step S4 concurrently with steps S2 and S3. In this embodiment, step S4 is an operation flow similar to that of steps S2 and S3. The operation flow of step 4 will be described below with reference to FIG. 4.

After step S4 is started, at step S51, the controller 12 functions as the difference calculating part 64 and calculates the difference between the target position $W_t$ and the current position of the workpiece W in the θ-direction. The θ-direction in this embodiment indicates the direction designated by an arrow θ in FIG. 5, i.e., the counterclockwise-rotation direction about the axis O when viewed from the front side of FIG. 5 (i.e., from the z-axis plus direction).

At this step S51, the controller 12 calculates a difference $\delta\phi_n$ between an inclination angle $\phi_n$ of the reference line 56 of the workpiece W with respect to the x-axis and an inclination angle $\phi_t$ of the reference line 62 of the target position $W_t$ with respect to the x-axis (i.e., $\delta\phi_n=\phi_n-\phi_t$), in which the inclination angle $\phi_n$ is received from the vision sensor 22 for the n-th time at step S1. Note that, $\phi_t$ is zero in the example shown in FIG. 5 as stated above, and therefore $\delta\phi_n=\phi_n$.

At step S52, the controller 12 functions as the difference determining part 66 and determines whether the difference $\delta\phi_n$ calculated at step S51 is within a predetermined allowable range. Specifically, the controller 12 reads out from the storage a third allowable range [$\varepsilon_1$, $\varepsilon_2$] (e.g., [−1°, 1°]) which is pre-stored, and determines whether $\varepsilon_1 \leq \delta\phi_n(=\phi_n) \leq \varepsilon_2$ is satisfied.

The controller 12 proceeds to step S53 when it determines that $\varepsilon_1 \leq \delta\phi_n \leq \varepsilon_2$ is satisfied (i.e., determines "YES"). On the other hand, the controller 12 proceeds to step S54 when it determines that $\delta\phi_n < \varepsilon_1$ or $\varepsilon_2 < \delta\phi_n$ is satisfied (i.e., determines "NO").

When having determined "NO" at step S52, at step S54, the controller 12 functions as the direction determining part 68 and determines the movement direction of the movable base 14 which can reduce the difference $\delta\phi_n$.

For example, in the example shown in FIG. 5, the reference line 56 set for the workpiece W is turned by an angle φ from the x-axis in the counterclockwise direction when viewed from the front side of FIG. 5 (i.e., from the z-axis plus direction). In this case, the controller 12 determines the rotation direction of the movable base 14 driven by the third drive mechanism 20 as the "θ-direction".

At step S55, the controller 12 determines whether the rotation direction determined at step S54 is reversed from the direction in which the movable base 14 actually rotates when step S54 is started.

When the controller 12 determines that the rotational direction determined at step S54 is reversed from the rotational direction at the start of step S54 (i.e., determines "YES"), it proceeds to step S56. On the other hand, when the controller 12 determines that the rotational direction determined at step S54 is the same as the rotational direction at the start of step S54 (i.e., determines "NO"), it proceeds to step S57.

At step S56, the controller 12 sets the rotation speed of the movable base 14 at a second rotation speed $R_2$ lower than a first rotation speed $R_1$ applied at the start of step S54.

At the start of the flow shown in FIG. 3, the rotation speed command to be transmitted from the controller 12 to a servo motor 48 of the third drive mechanism 20 is set at a first rotation speed command corresponding to the first rotation speed $R_1$.

Therefore, if the controller 12 normally rotates the movable base 14 by the third drive mechanism 20, the controller 12 transmits the first rotation speed command to the servo motor 48 so as to rotate the movable base 14 about the axis O at the first rotation speed $R_1$.

On the other hand, when the controller 12 determines "YES" at step S55, at this step S56, the controller 12 changes the setting of the rotation speed command, which is to be transmitted to the servo motor 48 of the third drive mechanism 20, from the first rotation speed command to the second rotation speed command corresponding to the second rotation speed $R_2$.

Then, at step S57 which will be described later, the controller 12 transmits the second rotation speed command to the servo motor 48 of the third drive mechanism 20, so as to rotate the movable base 14 about the axis O at the second rotation speed $R_2$ lower than the first rotation speed $R_1$.

At step S57, the controller 12 functions as the drive controller 70 and controls the third drive mechanism 20 so as to rotate the movable base 14 in the rotational direction determined at step S54 or step S60 which will be described later.

Specifically, the controller 12 transmits the first or second rotation speed command set at the current time to the servo motor 48 of the third drive mechanism 20, so as to rotate the movable base 14 about the axis O by the third drive mechanism 20.

After the controller 12 has executed step S57, the controller 12 returns to step S51. Then, the controller 12 again calculates a difference $\delta\phi_{n+1}$ between an inclination angle $\phi_{n+1}$ of the reference line 56 of the workpiece W and an inclination angle $\phi_t$ of the reference line 62 of the target position $W_t$ (i.e., $\delta\phi_{n+1}=\phi_{n+1}-\phi_t$) in which the inclination angle $\phi_{n+1}$ is received from the vision sensor 22 for the (n+1)-th time at step S1. Then, the controller 12 again determines whether the difference $\delta\phi_{n+1}$ is within the first allowable range at step S52.

In this way, the controller 12 executes steps S51, S52, and S54 to S57 each time the vision sensor 22 detects the current position of the workpiece W at step S1, until the controller 12 determines "YES" at step S52.

When the controller 12 determines "YES" at step S52, at step S53, the controller 12 functions as the drive controller 70 and controls the third drive mechanism 20 so as to stop the rotation of the movable base 14. Specifically, the controller 12 transmits a command to the servo motor 48 of the third drive mechanism 20 so as to stop the rotation of the servo motor 48, thereby the rotational movement of the movable base 14 about the axis O is stopped.

At step S58, the controller 12 calculates the difference between the target position $W_t$ and the current position of the workpiece W in the θ-direction, similar to the above-mentioned step S51.

Specifically, the controller 12 acquires from the vision sensor 22 an inclination angle $\phi_m$ of the reference line 56 of the workpiece W, which is further detected by the vision sensor 22 after step S53 is ended. Then, the controller 12 calculates a difference $\delta\phi_m$ between the acquired inclination angle $\phi_m$ and the inclination angle $\phi_t$ of the reference line 62 of the target position $W_t$ (i.e., $\delta\phi_m=\phi_m-\phi_t$).

At step S59, the controller 12 determines whether the difference $\delta\phi_m$ calculated at step S58 satisfies $\varepsilon_1 \leq \delta\phi_m \leq \varepsilon_2$. The controller 12 ends step S4 shown in FIG. 4 when it determines that $\varepsilon_1 \leq \delta\phi_m \leq \varepsilon_2$ is satisfied (i.e., determines "YES"). On the other hand, the controller 12 proceeds to step S60 when it determines that $\delta\phi_m < \varepsilon_1$ or $\varepsilon_2 < \delta\phi_m$ is satisfied (i.e., determines "NO").

At step S60, the controller 12 determines the rotational direction of the movable base 14 which can reduce the difference $\delta\phi_m$ calculated at step S58, similar to the above-mentioned step S54, and proceeds to step S56. Then, the controller 12 executes a loop of steps S51 to S60 until it determines "YES" at steps S52 and S59.

In this embodiment, when the movable base 14 is moved in order to position the workpiece W at the target position $W_t$, the vision sensor 22 repeatedly detects the current position of the workpiece W, and constantly monitors the difference between the current position of the workpiece W and the target position.

Then, the operations of determining the movement direction of the movable base 14 (steps S14, S34, and S54) and moving the movable base 14 (steps S17, S37, and S57) are continuously executed, until the difference is within the allowable range.

According to this configuration, it is possible to constantly monitor the difference between the current position of the workpiece W and the target position and correct the movement of the movable base 14 so as to reduce the difference, even if there are some errors in the accuracy of movement of the movable base 14 by the first drive mechanism 16, the second drive mechanism 18, and the third drive mechanism 20. Accordingly, the workpiece W can be reliably positioned at the target position $W_t$.

Further, the workpiece can be positioned at the target position $W_t$ without strictly calibrating the amount of movement of the movable base 14 by the first drive mechanism 16, the second drive mechanism 18, and the third drive mechanism 20. Due to this, it is possible to reduce the maintenance work for the workpiece positioning device 10.

Further, according to this embodiment, the workpiece W can be reliably positioned at the target position $W_t$, even if the position of the workpiece W with respect to the movable base 14 is deviated during the movable base 14 is moving. Therefore, a jig or clamp mechanism for preventing the workpiece W from deviating is not necessary, thereby it is possible to produce the workpiece positioning device 10 with a lower cost.

Further, in this embodiment, when having determined "NO" at steps S12, S32, and S52, the controller 12 determines only the movement direction of the movable base 14 (steps S14, S34, and S54), instead of calculating the amount of movement, by which the movable base 14 should be moved by the drive mechanisms 16, 18, and 20 (i.e., the number of revolutions of the servo motors 24, 36, and 48).

According to this configuration, the computation amount by the controller 12 can be reduced. Therefore, it is possible to smoothly execute the loop of steps S11, S12, and S14 to S17, steps S31, S32, and S34 to S37, or steps S51, S52, and S54 to S57 shown in FIG. 4 at the period T, even if the vision sensor 22 monitors the current position of the workpiece W at a relatively short period T, Further, according to this embodiment, if the movement direction of the movable base 14 determined at step S14, S34 or S54 is reversed from the direction in which the movable base 14 moves at this time, the moving speed of the movable base 14 is reduced (step S16, S36, or S56).

Such a reverse of the movement direction could be occurred when the workpiece W moves toward the target position $W_t$ and then accidentally passes the target position W. By reducing the moving speed of the movable base 14 in such a case, it is possible to facilitate repositioning the workpiece W, which has passed the target position $W_t$, at the target position $W_t$.

Further, in this embodiment, the vision sensor 22 further acquires the current position of the workpiece W after steps S13, S33, and S53. Then, the controller 12 further calculates the difference between the target position $W_t$ and the current position of the workpiece W (steps S18, S38, and S58) after steps S13, S33, and S53.

Then, the controller 12 reduces the moving speed of the movable base 14 (steps S16, S36, and S56) and repositions the workpiece W, if the difference is out of the allowable range.

According to this configuration, it is possible to reliably position the workpiece W at the target position $W_t$, even if the movable base 14 is further moved so that the workpiece W is separated away from the target position $W_t$ until the movable base 14 is stopped at steps S13, S33, and S53 after the controller 12 determines "YES" at steps S12, S32, and S52.

Further, according to this configuration, the workpiece W can be reliably positioned at the target position $W_t$ even if the moving speed of the movable base 14 is set to a relatively high speed at the start of the flow shown in FIG. 3. Due to this, it is possible to shorten the cycle time of the operation flow shown in FIG. 3.

Next, with reference to FIG. 6, an alternative of the operation flow of steps S2, S3, and S4 shown in FIG. 4 will be described below. In steps S2', S3', and S4' shown in FIG. 6, the controller 12 executes steps S21, S41, and S61 after it determines "NO" at steps S15, S35, and S55.

The operation of step S21 in step S2' will be described below. At step S21, the controller 12 determines whether the difference $\delta x_n$ calculated at step S11 is a value approximate to the first allowable range $[\beta_1, \beta_2]$.

Specifically, the controller 12 calculates a difference $\delta 1_n$ between the difference $\delta x_n$ and the threshold value $\beta_1$ of the first allowable range (i.e., $\delta 1_n = |\delta x_n - \beta_1|$). In addition, controller 12 calculates a difference $\delta 2_n$ between the difference $\delta x_n$ and the threshold value $\beta_2$ of the first allowable range (i.e., $\delta 2_n = |\delta x_n - \beta_2|$). Then, the controller 12 determines whether either of the difference $\delta 1_n$ or $\delta 2_n$ is smaller than a threshold value pre-stored in the storage.

When either of the difference $\delta 1_n$ or $\delta 2_n$ is smaller than the threshold value, the controller 12 determines that the difference $\delta x_n$ is a value approximate to the first allowable range $[\beta_1, \beta_2]$ (i.e., determines "YES"), and proceeds to step S16.

On the other hand, when either of the difference $\delta 1_n$ or $\delta 2_n$ is equal to or more than the pre-stored threshold value, the controller 12 determines that the difference $\delta x_n$ is a value far from the first allowable range $[\beta_1, \beta_2]$ (i.e., determines "NO"), and proceeds to step S17. Note that, steps S41 and S61 are similar to step S21, and therefore the detailed descriptions thereof are omitted.

Figure 6:
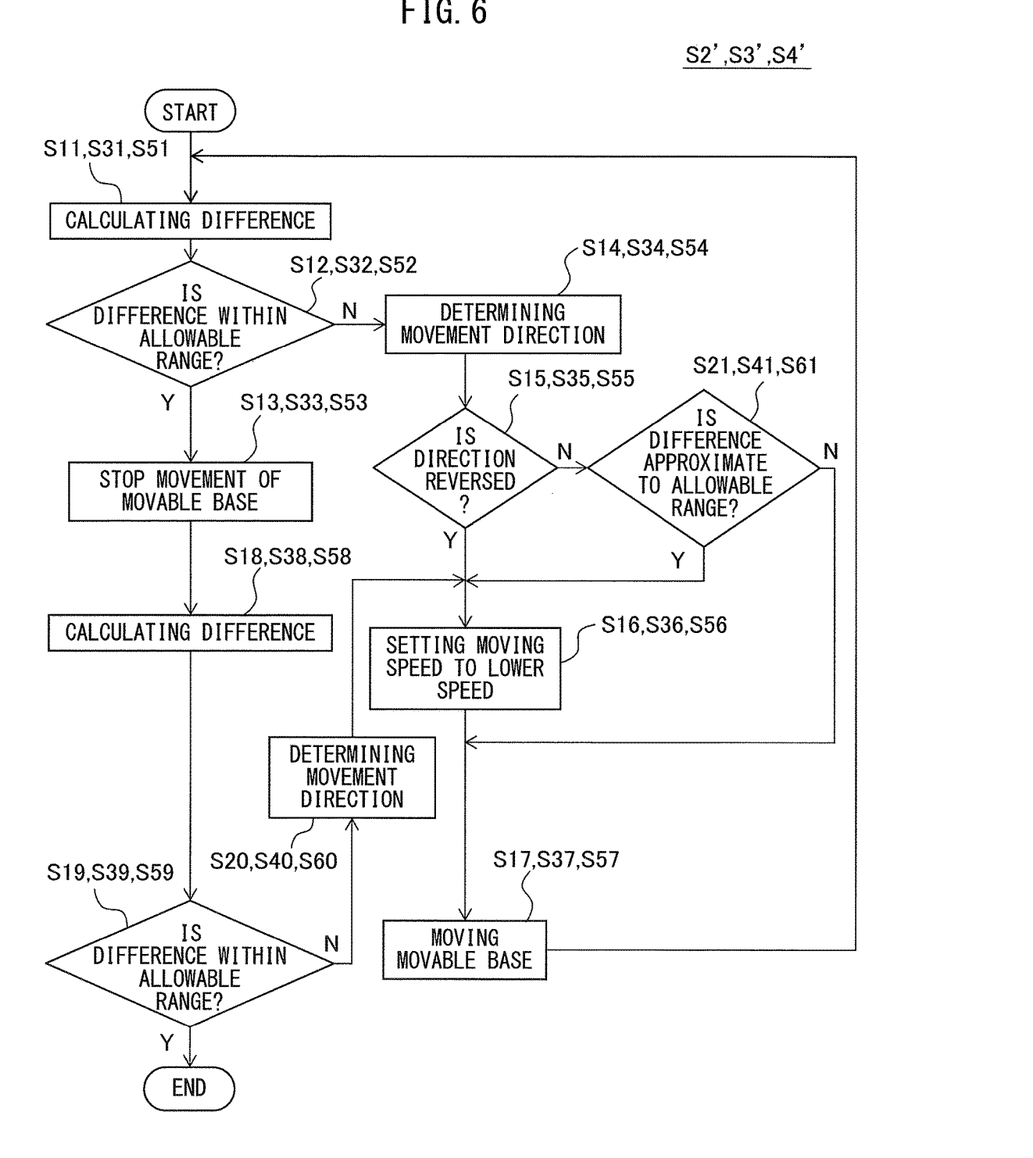
FIG. 6 is a flowchart showing another example of steps S2, S3, and S4 in FIG. 4.

According to the operation flow shown in FIG. 6, the moving speed of the movable base 14 can be set to a low speed when the current position of the workpiece W is closer to the target position W. Due to this, it is possible to position the workpiece W at the target position $W_t$ easier.

Figure 4:
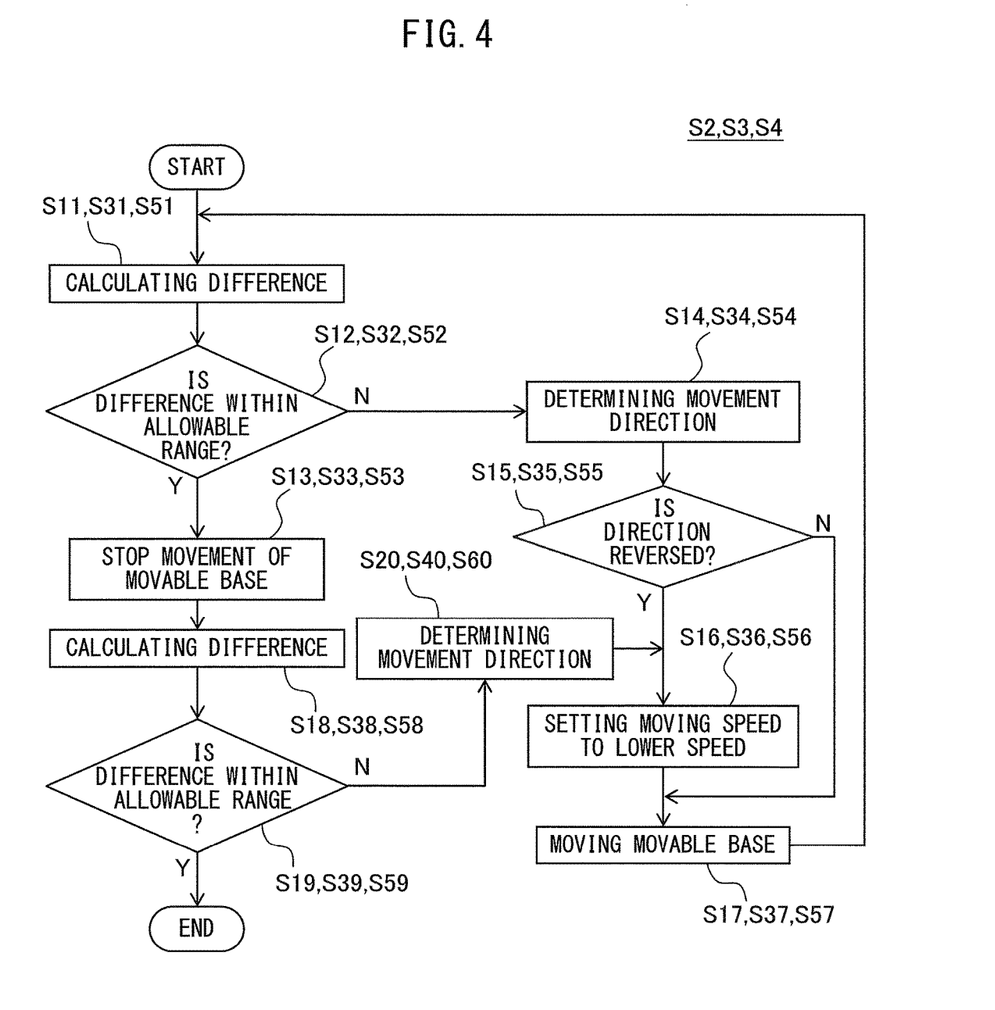
FIG. 4 is a flowchart of an example of the operation flow of steps S2, S3, and S4 in FIG. 3.

Note that, steps S18, S38, and S58, steps S19, S39, and S59, and steps S20, S40, and S60 may be omitted from the flows shown in FIGS. 4 and 6. In this case, the controller 12 ends the flows shown in FIGS. 4 and 6 after executing steps S13, S33, and S53.

Further, steps S15, S35, and S55, and steps S16, S36, and S56 may be omitted from the flow shown in FIG. 4. In this case, the controller 12 proceeds to steps S17, S37, and S57 after executing steps S14, S34, and S54.

Further, steps S15, S35, and S55 may be omitted from the flow shown in FIG. 6. In this case, the controller 12 proceeds to steps S21, S41, and S61 after executing steps S14, S34, and S54.

Further, instead of the servo motor 24, 36, or 48, other drive part such as an air cylinder may be applied.

Further, at step S1, the vision sensor 22 may repeatedly image the workpiece W so as to repeatedly detect the current position of the workpiece W, in a non-periodical manner.

Further, at step S1, the vision sensor 22 may calculate the inclination angle of with respect to the y-axis, as data indicative of the current position of the workpiece W, in which the reference line 56 is set for the workpiece W.

Alternatively, the vision sensor 22 may calculate an inclination angle the reference line 56 with respect to any other reference axis.

In this case, the storage pre-stores an inclination angle of the reference line 62 of the target position $W_t$ with respect to the y-axis (or other reference axis), which corresponds to the inclination angle of the reference line 56 with respect to the y-axis (or other reference axis).

Further, the vision sensor 22 may calculate a gradient ($=\Delta y/\Delta x$) of the reference line 56 in the xy-coordinate, instead of the inclination angle $\phi$ of the reference line 56. In this case, the storage pre-stores a gradient of the reference line 62, which corresponds to the gradient of the reference line 56.

Further, at step S1, the vision sensor 22 may calculate any reference point on the workpiece W, as data indicative of the current position of the workpiece W, instead of the above-mentioned central coordinate P (x, y). In this case, the storage pre-stores a target reference point set on the target position $W_t$ so as to correspond to the reference point on the workpiece W.

Further, in the above-mentioned embodiments, the movable base 14 is moved in the x-axis direction, the y-axis direction, and the $\theta$-direction by the first drive mechanism 16, the second drive mechanism 18, and the third drive mechanism 20, respectively.

However, it is obvious for a person skilled in the art that the concept of the invention can also be applied to a workpiece positioning device including only the first drive mechanism 16, or a workpiece positioning device including the first drive mechanism 16 and the second drive mechanism 18.

Further, the direction determining part 68 can be omitted from the workpiece positioning device 10. Even in this case, the workpiece positioning device 10 can position the workpiece W at the target position $W_t$ by constantly monitoring the difference between the target position and the current position of the workpiece W repeatedly transmitted from the vision sensor 22.

Although the invention has been described above through various embodiments, the embodiments do not limit the inventions according to the claims. Further, a configuration obtained by combining the features described in the embodiments of the invention can be included in the technical scope of the invention. However, all combinations of these features are not necessarily essential for means for solving the invention. Furthermore, it is obvious for a person skilled in the art that various modifications or improvements can be applied to the embodiments.

Regarding the order of operations, such as actions, sequences, steps, processes, and stages, in the devices, systems, programs, and methods indicated in the claims, specification and drawings, it should be noted that the terms "before", "prior to", etc. are not explicitly described, and any order can be realized unless the output of a previous operation is used in the subsequent operation. Regarding the operation flows in the claims, specification, and drawings, the order of operations described using the terms "first", "next", "subsequently", "then", etc., for convenience is not necessarily meant to be essential for the invention.

The invention claimed is:

1. A workpiece positioning device configured to position a workpiece at a predetermined target position, comprising:
   a movable base on which a workpiece is placed;
   a drive mechanism configured to move the movable base in a predetermined plurality of directions;

a vision sensor configured to repeatedly image the workpiece placed on the movable base during the drive mechanism moves the movable base in order to position the workpiece at the target position, and repeatedly detect a current position of the workpiece;

a difference calculating part configured to calculate a difference between the detected current position and the target position each time the current position is detected by the vision sensor;

a difference determining part configured to determine whether the calculated difference is within an allowable range each time the difference is calculated by the difference calculating part;

a direction determining part configured to determine a movement direction of the movable base, which can reduce the difference, from the plurality of directions, when the difference determining part determines that the difference is out of the allowable range; and a drive controller configured to control the drive mechanism so as to:
  stop the movement of the movable base when the difference determining part determines that the difference is within the allowable range; and
  move the movable base in the movement direction determined by the direction determining part, when the difference determining part determines that the difference is out of the allowable range.

2. The workpiece positioning device according to claim 1, wherein
  if the movement direction determined by the direction determining part is opposite to a direction in which the movable base moves at the time when the movement direction is determined, the drive controller moves the movable base in the determined movement direction at a speed lower than the moving speed of the movable base at the time when the movement direction is determined.

3. The workpiece positioning device according to claim 1, wherein
  the vision sensor further detects the current position of the workpiece after the drive controller stops the movement of the movable base,
  the difference calculating part calculates the difference between the target position and the current position detected by the vision sensor after the movement of the movable base is stopped,
  the difference determining part determines whether the difference calculated by the difference calculating part after the movement of the movable base is stopped is within the allowable range,
  the direction determining part re-determines the movement direction of the movable base, which can reduce the difference, from the plurality of directions, when the difference determining part determines that the difference is out of the allowable range after the movement of the movable base is stopped, and
  the drive controller controls the drive mechanism so as to move the movable base in the movement direction determined by the direction determining part after the movement of the movable base is stopped.

4. A workpiece positioning device configured to position a workpiece at a predetermined target position, comprising:
  a movable base on which a workpiece is placed;
  a first drive mechanism configured to move the movable base along a first axis;
  a second drive mechanism configured to move the movable base along a second axis intersecting with the first axis;
  a vision sensor configured to repeatedly image the workpiece placed on the movable base during the first and second drive mechanisms move the movable base in order to position the workpiece at the target position, and repeatedly detect a current position of the workpiece;
  a difference calculating part configured to calculate a first difference between the current position and the target position in a first axis direction, and a second difference between the current position and the target position in a second axis direction, each time the current position is detected by the vision sensor;
  a difference determining part configured to determine whether the first difference is within a first allowable range, and whether the second difference is within a second allowable range, each time the first and second differences are calculated by the difference calculating party; and
  a drive controller configured to control:
    the first drive mechanism so as to stop the movement of the movable base in the first axis direction when the difference determining part determines that the first difference is within the first allowable range; and
    the second drive mechanism so as to stop the movement of the movable base in the second axis direction when the difference determining part determines that the second difference is within the second allowable range.

* * * * *